United States Patent [19]

Aston

[11] Patent Number: 5,014,030

[45] Date of Patent: May 7, 1991

[54] ELECTROMAGNETICALLY ACTIVATED MECHANISMS

[75] Inventor: Walter J. Aston, Dudley, United Kingdom

[73] Assignee: Yale Security Products Ltd., Willenhall, England

[21] Appl. No.: 441,520

[22] Filed: Nov. 27, 1989

[30] Foreign Application Priority Data

Nov. 30, 1988 [GB] United Kingdom ................. 8827906

[51] Int. Cl.[5] ........................ E05B 47/06; G05G 5/06; F16D 23/00; H01F 7/18

[52] U.S. Cl. .................................... 335/228; 335/173; 70/283; 74/527; 192/93 A

[58] Field of Search ........................ 335/228, 110, 173; 70/283; 74/527; 192/93 A

[56] References Cited

U.S. PATENT DOCUMENTS

| | | | |
|---|---|---|---|
| 4,529,234 | 7/1985 | Senfren | 70/283 |
| 4,625,848 | 12/1986 | Meyers et al. | 70/283 |
| 4,656,850 | 4/1987 | Tabata | 70/283 |
| 4,671,087 | 6/1987 | Olenfalk et al. | 70/283 |
| 4,762,212 | 8/1988 | Fish et al. | 70/283 |

FOREIGN PATENT DOCUMENTS

| | | | |
|---|---|---|---|
| 0148701 | 7/1985 | European Pat. Off. | 70/283 |
| 0167767 | 1/1986 | European Pat. Off. . | |
| 0190809 | 8/1986 | European Pat. Off. | 70/283 |
| 0290330 | 11/1988 | European Pat. Off. | 70/283 |
| 0292361 | 11/1988 | European Pat. Off. | 70/283 |
| 3707250 | 7/1988 | Fed. Rep. of Germany | 70/283 |
| 2163474 | 2/1986 | United Kingdom | 70/283 |
| 8702735 | 5/1987 | World Int. Prop. O. | 70/283 |

*Primary Examiner*—Steven L. Stephan
*Assistant Examiner*—Nilay H. Vyas
*Attorney, Agent, or Firm*—Fleit, Jacobson, Cohn, Price, Holman & Stern

[57] ABSTRACT

An electromagnetically activated mechanism has mechanical input and output members, at least one of which cooperates with the armature of an electromagnet which is energisable to prevent or limit movement of that member. The electromagnet and its armature are located so that when the electromagnet is de-energized the armature can be urged by the aforesaid one member towards a position in which the magnetic gap between the armature and the electromagnet is a minimum.

8 Claims, 3 Drawing Sheets

ELECTROMAGNETICALLY ACTIVATED MECHANISMS

BACKGROUND OF THE INVENTION

This invention relates to electromagnetically activated mechanisms.

Currently available lithium batteries are capable of prolonged life and electronic circuits are now available which draw very low current so as to conserve battery energy. In the area of interfacing electronic circuits with mechanical devices, however, problems of battery energy conservation still arise. When it is required to make a particular mechanical action contingent on a particular electrical signal., it is usual at present to use a solenoid, which actually displaces a part of the mechanical device. Generally speaking, this approach to electronic/mechanical interfacing is not energy efficient and it is an object of the present invention to provide an electromagnetically activated mechanism of improved efficiency.

BRIEF SUMMARY OF THE INVENTION

An electromagnetically activated mechanism in accordance with the invention comprises a mechanical input member, a mechanical output member, an electromagnet and a movable element which is subject to attraction by the electromagnet when the latter is energised, the mechanism having a rest condition in which a gap between the electromagnet and said movable element is at a minimum and, when said electromagnet is not energised, said movable element being displaceable away from the position it occupies in a first condition of the mechanism, displacement of said movable element preventing or limiting movement of said output member.

With such an arrangement, since the gap between the electromagnet and said movable element is at a minimum in the rest condition, the current required to hold said movable element in position is small. No high energy pulse is required, as in conventional electromagnetic mechanisms, to pull in the movable element.

There are two basic ways in which the invention can be applied, namely in clutch-type mechanisms and in brake or detent-type mechanisms. In the former case, there are clutch elements on the input and output members and the clutch element on the input member is required to react against said movable member to enable clutch operation to take place. If the electromagnet is not energised the movable element is free to move and is therefore unable to provide the necessary reaction force. In the latter case said movable element acts as a brake or detent element which, when not held in place by electromagnet energisation, can move to a brake or detent position on initial displacement of the input member to prevent further displacement thereof. With this type of mechanism the detent action is preferably such that the force applied to the input member to displace it does not increase the forces acting on the movable element to separate it from the electromagnet when the latter is energised.

BRIEF DESCRIPTION OF THE DRAWINGS

The invention will now be described in detail with reference to the accompanying drawings wherein.

DETAILED DESCRIPTION

Figure 1:
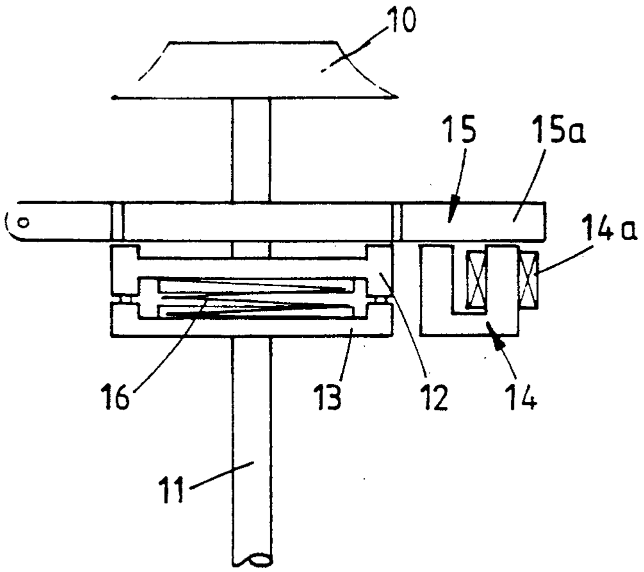
FIG. 1 is a diagrammatic sectional view showing one example of a clutch type mechanism in accordance with the invention.
Figure 2:
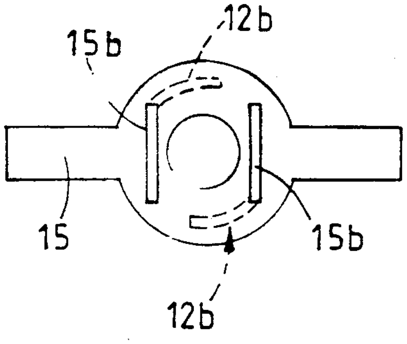
FIG. 2 is a view of a clutch reaction element included in the mechanism of FIG. 1.
Figure 3:
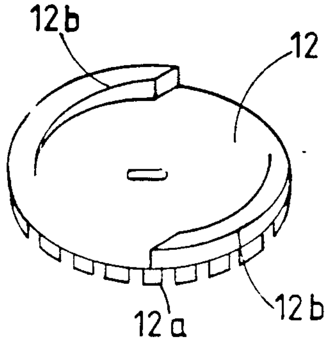
FIG. 3 is a perspective view of a clutch input element included in the mechanism of FIG. 1.

Referring firstly to FIGS. 1 to 3, the mechanical input member of the mechanism is a knob 10 on an input shaft 11. There is an output member in the form of an output shaft 11. Secured or keyed to the two shafts 10 and 11 are a clutch input element 12 and a clutch output element 13. These have castellations or similarly interengageable drive formations such as those shown at 12a in FIG. 3 to enable a positive drive connection between the input and output members to be established when required.

An electromagnet 14 is incorporated in the mechanism for determining whether or not the clutch is to be engaged on turning of the input member 10. This electromagnet comprises a winding 14a on one limb of a U-shaped core. The electromagnet coacts with a pivotally mounted movable element 15, the general shape of which is shown in FIG. 2. The element 15 is urged by gravity or a light spring (not shown) towards the position shown in which a part 15a actually makes face contact with the ends of the limbs of the magnet core. In this position the gap between the electromagnet and the element 15 is at a minimum.

As shown in FIGS. 2 and 3 the element 15 and clutch input member 12 have adjacent faces shaped so that relative angular movement between these parts causes relative axial displacement. As shown the element 15 has two ribs 15b and the clutch has a pair of curved ramps 12b. The member 12 and element 15 thus act as a cam and follower and have the effect of separating these two parts axially as they are turned relative to one another away from their engaged positions.

When the input member 10 is turned whilst the electromagnet is not energized, the element 15 is free to pivot towards and away from the clutch input member 12 and the clutch is not, therefore, engage..d. If the electromagnet is, however, energized, the element 15 is held stationary and the clutch input member 12 is displaced against its spring 16 into driving engagement with member 13. It is preferably arranged that the electromagnet 14 is energized when the part 15a is at its closest approach to the electromagnet core.

Though a very small electromagnetic force is required to effect driving engagement between the members 12, 13 the element 15 may require to be moved against that force from a distance which corresponds to the disengaged separation of the members 12, 13. Other embodiments described below permit the movable element to be maintained in contact with the electromagnet when the latter is de-energised, this condition being referred to as a rest condition of the mechanism.

Figure 4:
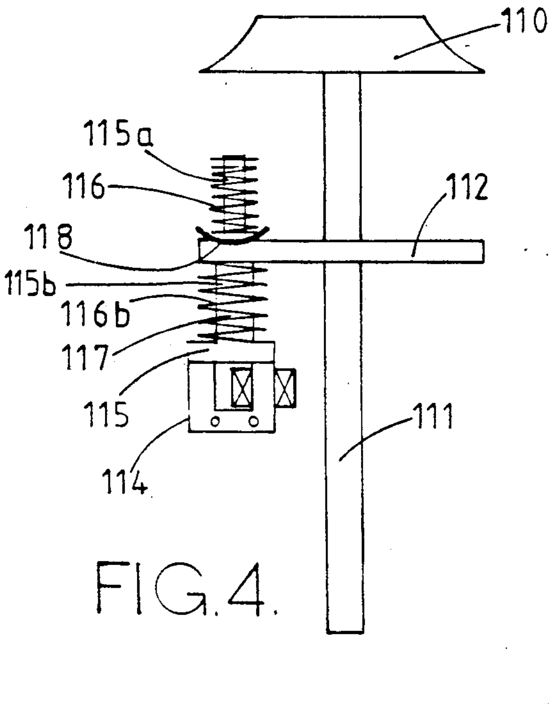
FIG. 4 is a diagrammatic view of a first example of a detent-type mechanism in accordance with the invention.
Figure 5:
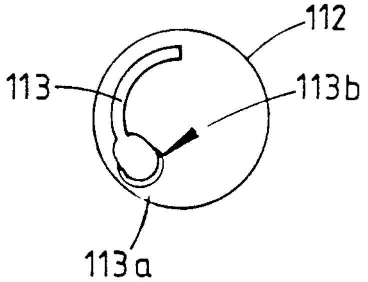
FIG. 5 is a view of a locking plate forming a part of the mechanism of FIG. 4.
Figure 6:
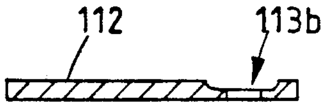
FIG. 6 is a fragmentary section of the plate shown in FIG. 5.

In the example shown in FIGS. 4 to 6, the input and output members are joined together and comprise a knob 110 and a shaft 111. A disc 112 is mounted on the shaft 111 and may be regarded as forming a part of the input member. The disc 112 is formed with an arcuate slot 113 which has a portion 113*a* at one end which is of larger width than the remainder. One face of the disc surrounding this portion 113*a* of the slot is recessed as shown at 113*b* in FIG. 6.

The electromagnet 114 coacts with an armature 115 which is movable in a direction parallel to the shaft axis. The armature 115 has a reduced portion 115*a* at one end and a larger portion 115*b* at the other end. The portion 115*b* can extend through the portion 113*a* of the slot, but not through the remainder thereof.

There are two springs 116 and 117 on the armature 115. Spring 116 is located between an abutment on the end of armature 115 remote from the electromagnet and a cup-shaped washer 118 which bears on the recessed face 113*b* of the disc 112. The other spring 117 is located between the other face of the disc and an abutment on the other end of the armature 115.

In the rest condition of the mechanism shown in FIG. 4, the cup washer 118 is seated in the recess in the disc 112 and the armature 115 is in contact with the core of the electromagnet 114. The enlarged portion 115*b* of the armature does not extend into the slot 113. If the electromagnet is energized, when the knob 110 is turned, the holding force provided by the magnet is sufficient to prevent the armature 115 being displaced axially by the spring 116 as the cup washer 118 climbs from the recess 113*b* in the disc 112, which acts as a face cam. The input/output shaft 111 can thus be turned. If the electromagnet 114 is not energized, however, the axial movement of the cup washer 118 as it climbs from the recess causes the armature 115 to be displaced axially (the spring 116 being stiffer than the spring 117) so that the enlarged portion 115*b* of the armature enters portion 113*a* of the slot and prevents further turning of the shaft 111.

Figure 7:
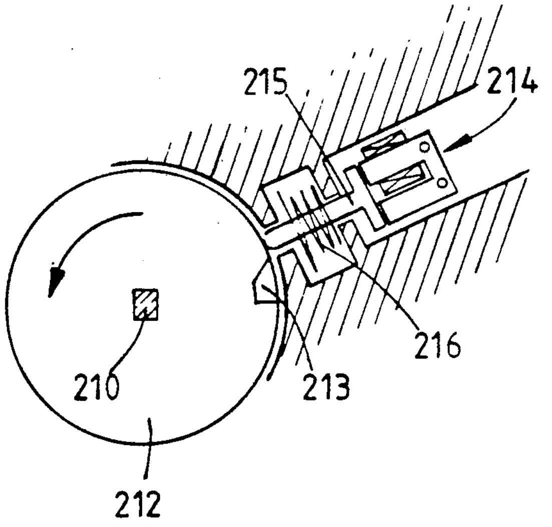
FIG. 7 is a diagrammatic view of a second example of a detent-type mechanism in accordance with the invention.

In the arrangement shown in FIG. 7, a shaft 210 provides both an input and an output member. A disc 212 is secured to the shaft 210 and has a notch 213 in its periphery. An electromagnet 214 has an armature 215 which is arranged to be movable radially relative to the disc 212. In the rest position shown the periphery of the disc 212 is holding the armature 215 in a radially outward position so that the outer end of the armature 215 is in substantially face contact with the core of the electromagnet 214. A spring 216 urges the armature 215 towards the disc 212.

When the electromagnet 214 is not energized, the armature 215 is moved radially inwardly as the disc 212 is turned counterclockwise from its rest position and acts as a detent to prevent further turning beyond a position in which the end of the armature 215 has entered the notch 213. The notch 213 is shaped to lift the armature 215 back to its rest position when the disc 212 is turned back to its rest position.

If the electromagnet 214 is energised, the armature 215 is held in its rest position and this leaves the disc 212 free to turn.

Figure 8:
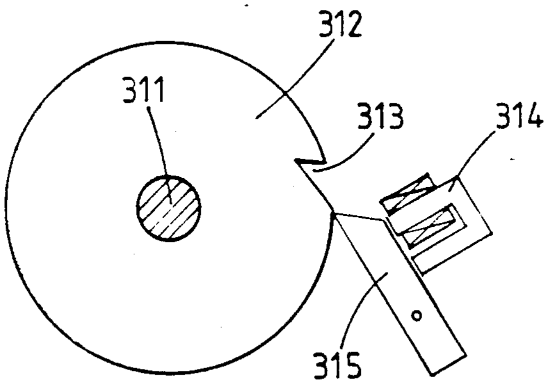
FIGS. 8 and 9 are diagrammatic views of a third example of a detent-type mechanism in accordance with the invention shown in two different positions.
Figure 9:
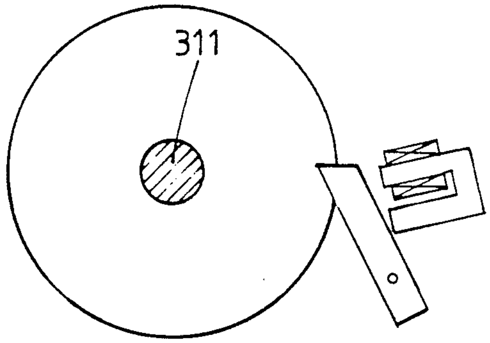

FIGS. 8 and 9 show a very simple example in which the armature is in the form of a pivotally mounted pawl 315 engageable in an undercut notch 313 in the periphery of a disc 312 secured to a shaft 311. A very light spring urging the pawl 315 towards the disc 312 may be provided in situations where gravitational bias is insufficient. In the rest position (FIG. 8) the pawl 315 rests on the periphery of the disc 312 to minimize the magnetic gap and can either drop into the notch 313 to limit angular movement of the disc 312 or be held clear according to the energization condition of the electromagnet 314.

One possible application for the mechanisms described above is in electronically controlled door locks. It has been calculated that based on average domestic usage of five four second energization periods per day, at 25 mA solenoid current, a currently available 1.2 Ah lithium sulphur dioxide cell could operate for at least ten years, assuming an electronics standby current of 1 $\mu$A and operating current of 5 mA (also for five four second periods per day). Currently available microprocessor technology can provide a circuit which will operate at 1 $\mu$A standby and 5 mA operating current levels and a simple single transistor output stage is all that is required to drive the electromagnet.

Figure 10:
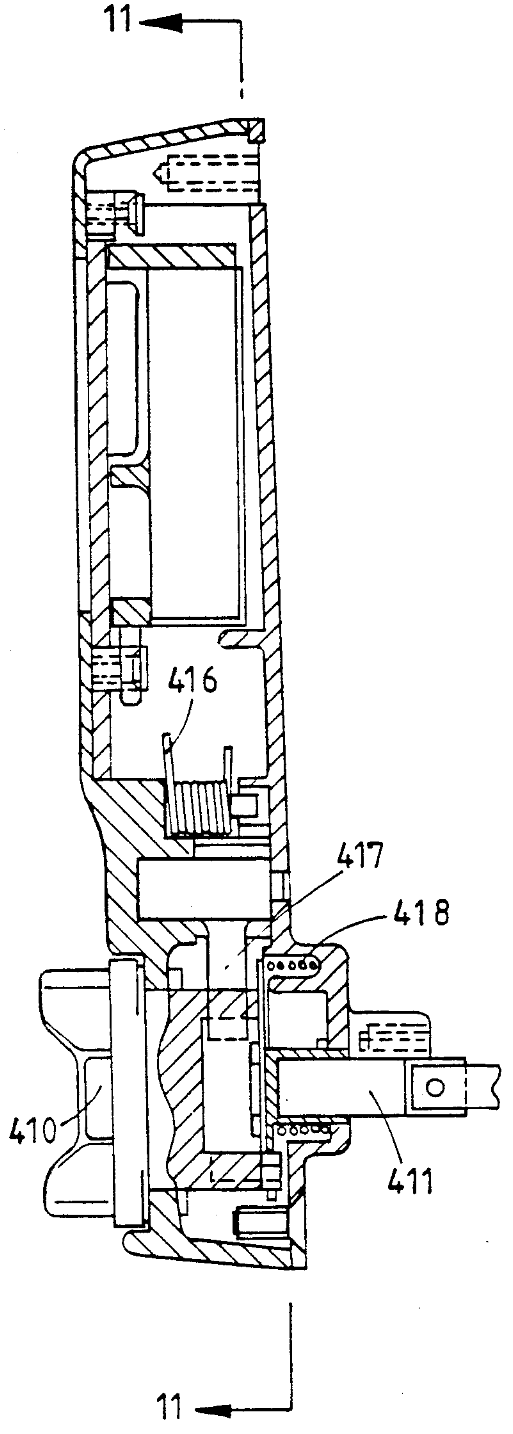
FIGS. 10 and 11 show a door lock arrangement incorporating the mechanism of FIGS. 8 and 9.
Figure 11:
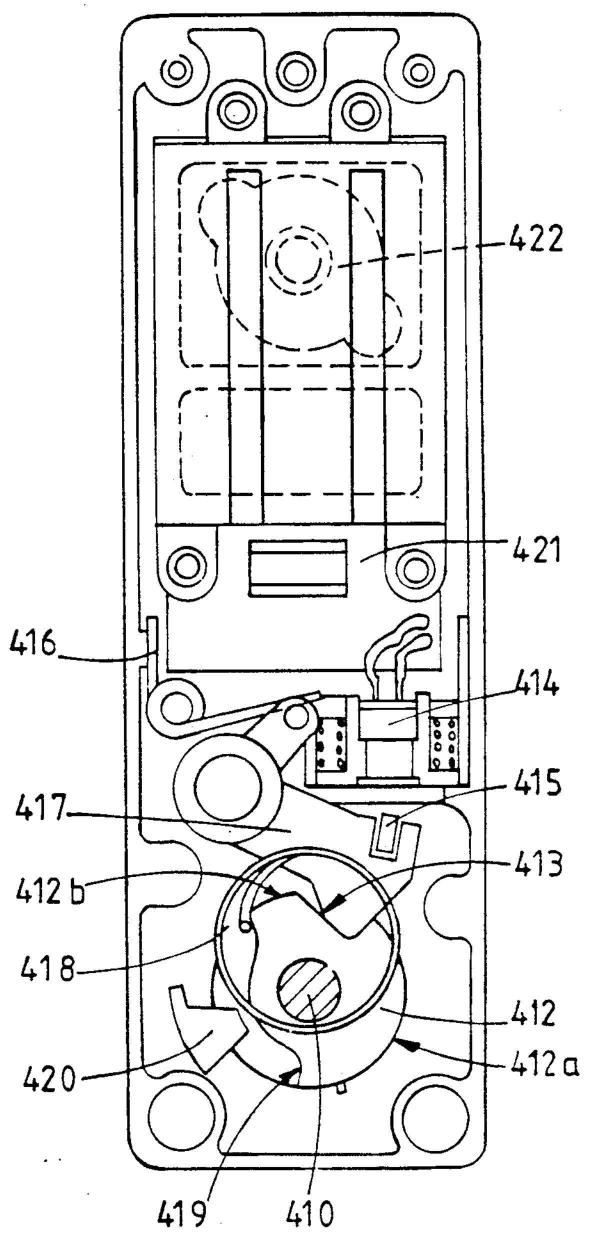

FIGS. 10 and 11 show the mechanism of FIGS. 8 and 9 incorporated into a door lock, FIG. 11 being a section on line 11—11 in FIG. 10. In this embodiment the input member comprises a key-receiving part 410 which may correspond to that of a known type of cylinder lock, and is coupled to an output member 411 for rotation therewith. The member 411 is, in use, coupled to the latch of the door. Secured to the member 410 is a cam plate 412 which has a recess 413 engageable by a lever 417 which carries an armature 415 of an electromagnet 414.

A torsion spring 416 biasses the lever 417 into contact with the plate 412. The plate 412 has peripheral portions 412*a*, 412*b* of equal radius on either side of the recess 413. The recess 413 is such that, when engaged by the lever 417, counterclockwise rotation of the plate 412, as viewed in FIG. 11, is prevented, and also such that clockwise rotation from the position shown allows the lever 41 to ride up on to the portion 412*b*. The members 410, 411 require to be rotated anti-clockwise beyond the position shown in FIG. 11 in order to unlatch the door.

A further torsion spring 418 urges an abutment face 419 of the plate 412 towards a stop 420. in which rest condition of the mechanism the lever 417 rides on the portion 412*b* and the armature 415 is in contact with a core of the electromagnet 414.

The electromagnet is energized through an electric circuit 421 powered by a lithium sulphur dioxide battery 422, when an appropriate key element is inserted in the input member 410. In this circumstance the lever 417 is thus maintained in a position corresponding to the rest condition of the mechanism while the members 410, 411 and plate 412 are rotated to bring the lever 417 into contact with the portion 412*a*, and thereby to release the door latch.

Electromagnetic force is thus not required to move the lever 417, but merely to maintain it in a position at which the efficiency of the electromagnet 414 is at its highest.

I claim:

1. An electromagnetically activated mechanism comprising:

mechanical input and output members coupled together for movement in unison;

a profiled part mounted on one of said input and output members for movement therewith;

a shaped profile on said profiled part;

an electromagnet; and an independently movable element mounted for attraction by said electromagnetic to prevent movement of said movable element when said electromagnet is energized, said independently movable element co-acting with said profile so that movement of said profiled part displaces said independently movable element when said electromagnet is deenergized, said displacement of said movable element producing variation of a gap between said movable element and said electromagnet, said gap being at a minimum when said input and output members are in a rest position;

said displacement of said independently movable element limiting movement of said output member, said independently movable element being engageable with said profiled part to arrest movement of said profiled part.

2. A mechanism as claimed in claim 1 wherein:

said movable element is operable to arrest movement of said profiled part when said electromagnet is de-energized.

3. A mechanism as claimed in claim 2 wherein:

said profiled part is in the form of a disc; and said independently movable element is engageable with a periphery of said disc in said rest position of the mechanism.

4. A mechanism as claimed in claim 3 wherein:

said profile comprises a recess in the periphery of said disc.

5. A mechanism as claimed in claim 2 wherein:

said profiled part is in the form of a disc; and said independently movable element is engageable with said disc adjacent the periphery thereof in said rest position of the mechanism.

6. A mechanism as claimed in claim 5 wherein:

said profile comprises a recess adjacent the periphery of said disc.

7. A mechanism as claimed in claim 1 wherein:

a control circuit is provided for said electromagnet;

said input member is adapted to receive a key device; and said control circuit is responsive to the presence of said key device in said input member to energize said electromagnet.

8. A mechanism as claimed in claim 1 and further comprising: means for urging said input and output members towards said rest position.

* * * * *